(12) United States Patent
Masiewicz (10) Patent No.: US 7,404,013 B1
(45) Date of Patent: Jul. 22, 2008

(54) PASS-THROUGH INFORMATION TRANSFERS INSERTED AFTER A CONTINUED PRIMITIVE IN SERIAL COMMUNICATIONS BETWEEN A DEVICE AND A HOST

(75) Inventor: John C. Masiewicz, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 429 days.

(21) Appl. No.: 11/130,944

(22) Filed: May 17, 2005

(51) Int. Cl.
*G06F 3/00* (2006.01)
(52) U.S. Cl. ............... 710/5; 710/2; 710/17; 710/20
(58) Field of Classification Search ............... 710/313, 710/2, 5, 17, 20
See application file for complete search history.

(56) References Cited

U.S. PATENT DOCUMENTS

| 2003/0131125 | A1 | 7/2003 | Ooi |
| 2003/0221061 | A1 | 11/2003 | El-Batal et al. |
| 2003/0236952 | A1 | 12/2003 | Grieff et al. |
| 2003/0236953 | A1* | 12/2003 | Grieff et al. ............... 711/151 |
| 2004/0019718 | A1 | 1/2004 | Schauer et al. |
| 2005/0086413 | A1* | 4/2005 | Lee et al. ............... 710/313 |

OTHER PUBLICATIONS

American National Standard for Information Technology, AT Attachment with Packet Interface—7 vol. 3 Serial Transport Protocols and Physical Interconnect (ATAIATAPI-7 V3), Apr. 21, 2004, pp. 19, 23, 35, 59-60, 121-122, 126-127, 132.*
Office Action dated Aug. 3, 2007 from U.S. Appl. No. 11/131,036, 14 pages.
John Masiewicz, "AT Attachment with Packet Interface—7 vol. 3—Serial Transport Protocols and Physical Interconnect", Working Draft American National Standard for Information Technology, T13 Project 1532D, Revision 4b, Apr. 21, 2004, pp. i-282.
Robert C. Elliott, "Serial Attached SCSI (SAS)", Working Draft American National Standard for Information Technology, Project T10/1562-D, Revision 5, Jul. 9, 2003, pp. i-432.
Office Action dated Feb. 20, 2008 from U.S. Appl. No. 11/131,036.

* cited by examiner

*Primary Examiner*—Tonia L. M. Dollinger
*Assistant Examiner*—Jonathan R Plante
(74) *Attorney, Agent, or Firm*—Blakely, Sokoloff, Taylor & Zafman (57) ABSTRACT

A device communicatively coupled to a host in a Serial Advanced Technology Attachment (SATA) format. The device includes a processor to control operations in the device and a serial interface to control serial communication with the host in accordance with the SATA format. The serial interface, after the transmission of a continued primitive, inserts pass-through information to the host within or outside of a frame information structure (FIS). If the host is not pass-through enabled, the host ignores the pass-through information. However, if the host is pass-through enabled, the host recognizes the pass-through information.

30 Claims, 7 Drawing Sheets

PASS-THROUGH INFORMATION TRANSFERS INSERTED AFTER A CONTINUED PRIMITIVE IN SERIAL COMMUNICATIONS BETWEEN A DEVICE AND A HOST

CROSS-REFERENCE TO RELATED APPLICATIONS

This application is related to: Ser. No. 11/131,036, filed on May 16, 2005, for inventor, John C. Masiewicz, and assigned to Western Digital Technologies, Inc., which is hereby incorporated by reference.

BACKGROUND OF THE INVENTION

1. Field of the Invention

The present invention relates to pass-through information transfers inserted after a continued primitive in serial communications between a device and a host. More particularly, the present invention relates to serial communication in accordance with a Serial Advanced Technology Attachment (SATA) format in which pass-through information may be inserted into information transfers that is recognized by enabled devices and ignored by non-enabled devices.

2. Description of the Preferred Embodiments and Related Information

Today, computing devices, such as computers, are routinely used both at work and in the home. Computing devices advantageously enable file sharing, the creation of electronic documents, the use of application specific software, and access to information and electronic commerce through the Internet and other computer networks.

Typically, a host computer is connected to another device, such as a storage peripheral (e.g. a hard disk drive). Storage devices and other types of devices are typically connected to a host computer through a host interface connector for the transfer of commands, status and data. For example, a host computer may access a disk drive device and read data from the disk drive and/or save data to the disk drive.

The host computer is typically connected to a device, such as a disk drive, through a cable connection or a printed circuit board (PCB) connection. This connection is generally termed an "interconnect". For compatibility, the connectors, cables, and interface protocol are typically standardized. Accordingly, the interfaces of both the device and the host need to comply with the same interface standard.

In the past, a host computer was typically connected to an external storage device, such as a hard disk drive, by a parallel interface. The most common parallel interface is the Parallel Advanced Technology Attachment/Integrated Drive Electronics (PATA/IDE) interface.

Today, storage devices, host computers, and other devices, are being designed to comply with newer faster standards that operate in a serial fashion. Examples of these newer serial standards include the Serial Advanced Technology Attachment (SATA) standard and the Serial Attached SCSI (SAS) standard. Both the SATA and SAS standards define various related specifications for SATA and SAS compliant connectors and cables, along with various interface protocols for SATA and SAS devices, respectively.

The serial interface defined by the related SATA and SAS protocols relates to the transfer of commands, data, and status via frame information structures (FISs). Unfortunately, the related SATA and SAS protocols do not allow for extensions to the protocol to provide enhancements without introducing significant compatibility issues with prior devices.

SUMMARY OF THE INVENTION

The present invention relates to pass-through information transfers inserted after a continued primitive in serial communications between a device and a host. More particularly, the present invention relates to serial communication in accordance with a Serial Advanced Technology Attachment (SATA) format in which pass-through information may be inserted into information transfers that is recognized by enabled devices and ignored by non-enabled devices.

In one aspect, the invention may be regarded as a device communicatively coupled to a host in a Serial Advanced Technology Attachment (SATA) format. The device includes a processor to control operations in the device and a serial interface to control serial communication with the host in accordance with the SATA format. The serial interface, after the transmission of a continued primitive, inserts pass-through information to the host within or outside of a frame information structure (FIS). If the host is not pass-through enabled, the host ignores the pass-through information. However, if the host is pass-through enabled, the host recognizes the pass-through information.

In one embodiment, inserted pass-through information after the transmission of the continued primitive further includes replacing pseudo-random data with a message information structure (MIS) that includes the pass-through information. The MIS transmitted by the device may include a start of message (SOM) primitive sequence to indicate a beginning of the pass-through information to be transmitted and an end of message (EOM) primitive sequence to indicate that the pass-through information has been transmitted. The MIS and the pass-through information may be scrambled.

In one embodiment, the pass-through information may include at least one of message, data, status, or a command. The inserting of pass-through information between the device and the host typically occurs at a link layer.

In one embodiment, the message information structure (MIS) and the pass-through information may be transmitted during an idle (SYNC) phase. Also, the message information structure (MIS) and the pass-through information may be transmitted during at least one of a transmit ready (X_RDY) HOLD phase, a HOLD Acknowledge phase, a wait for termination (WTRM) phase, a receipt ready (R_RDY) phase, a receipt in progress (R_IP) phase, or a receipt OK (R_OK) phase.

In one embodiment, the transmission of the pass-through information between the device and the host occurs in a simplex mode. In another embodiment, the transmission of the pass-through information between the device and the host occurs in a half-duplex mode. In yet another embodiment, the transmission of pass-through information between the device and the host occurs in a full duplex mode.

In another aspect, the invention may be regarded as a disk drive communicatively coupled to a host in a SATA format. The disk drive includes a disk to store data, a head to read and write data from and to the disk, respectively, a processor to control operations in the disk drive, and a serial interface to control serial communication with the host in accordance with the SATA format. Particularly, after the transmission of a continued primitive, the serial interface inserts pass-through information to the host within or outside of a frame information structure (FIS). If the host is not pass-through enabled, the host ignores the pass-through information. However, if the host is pass-through enabled, the host recognizes the pass-through information.

In yet another aspect, the invention may be regarded as a host communicatively coupled to a device in a SATA format.

The host comprises a processor to control operations in the host and a serial interface to control serial communication with the device in accordance with the SATA format. Particularly, after the transmission of a continued primitive, the serial interface inserts pass-through information to the device within or outside of a frame information structure (FIS). If the device is not pass-through enabled, the device ignores the pass-through information. However, if the device is pass-through enabled, the device recognizes the pass-through information.

The foregoing and other features of the invention are described in detail below and are set forth in the pending claims.

DETAILED DESCRIPTION

The present invention relates to pass-through information transfers inserted after a continued primitive in serial communications between a device and a host. More particularly, the present invention relates to serial communication in accordance with a Serial Advanced Technology Attachment (SATA) format in which pass-through information may be inserted into information transfers that is recognized by enabled devices and ignored by non-enabled devices.

The Serial Attached Technology Attachment (SATA) interface transfers commands, data, and status via Frame Information Structures (FISs). In addition, the SATA interface utilizes DWORD primitives to provide interface management and power management.

Embodiments of the invention relate techniques to transfer additional message information (e.g. commands, data, status, messages, addresses, ID's, security tags, controls, etc.) within the SATA interface inside or outside of a FIS without using additional primitives and does so in such a way as to allow existing SATA protocol to function as currently defined; while at the same time maintaining compatibility with existing SATA implementations. Additionally, newly defined primitives may also be used. The AT Attachment with Packet Interface, Serial Transport Protocols and Physical Interconnect (ATA-ATAP1-7 V3), as set forth by the American National Standard for Information Technology standard is hereby incorporated by reference, and will be referred to herein as the SATA format. Additionally, it will be appreciated that embodiments of the invention may be utilized with the Serial Attached SCSI (SAS) (T10/1562-D) standard [hereinafter referred to as the SAS format], which is also hereby incorporated by reference.

In explaining embodiments of the invention, in order to differentiate message information from existing frame information structures (FISs) to transfer payloads, the term message information structure (MIS) will be used and the payload of an MIS will be referred to as pass-through information.

Figure 1:
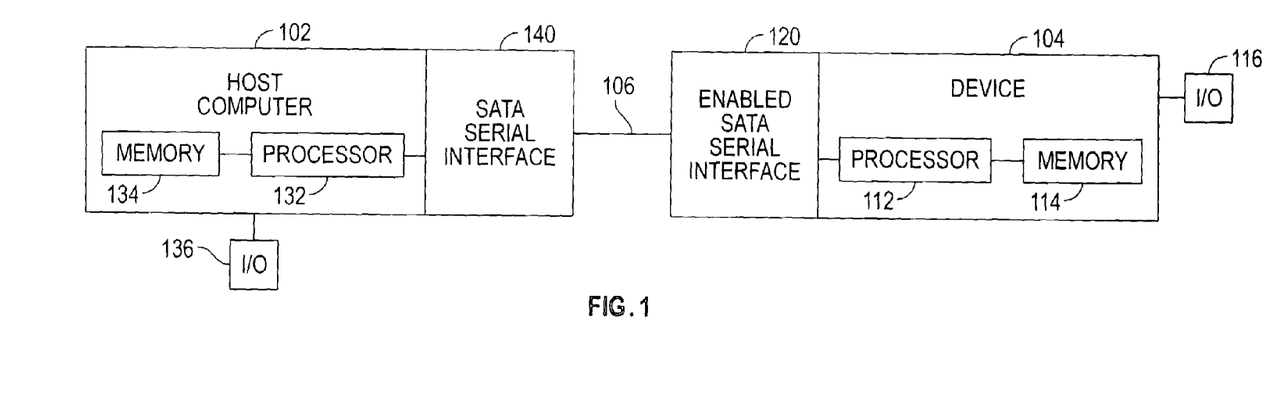
FIG. 1 is a block diagram illustrating a device having an enabled SATA serial interface coupled to a host computer having a standard SATA serial interface.

With reference to FIG. 1, FIG. 1 is a block diagram illustrating a device 104 having an enabled SATA serial interface coupled to a host computer having a standard SATA serial interface. Particularly, device 104 is communicatively coupled through an interconnect 106 to a host computer 102 in a SATA format. The device 104 includes a processor 112 to control operations in the device 104 and an enabled SATA serial interface 120 to control serial communication with the host computer 102 in accordance with the SATA format. Further, device 104 may include memory 114 coupled to processor 112 as well as a plurality of different input/output (I/O) devices 116.

In one embodiment, and as will be discussed in more detail later, the enabled SATA serial interface 120 after the transmission of a continued primitive, may insert pass-through information to the host computer 102 within or outside of a frame information structure (FIS). The host computer 102 may or may not be pass-through enabled.

As shown in FIG. 1, the host computer 102 includes a processor 132 to control operations in the host computer and a memory 134 coupled thereto, as well as various input/output devices (I/O) devices 136, and is not pass-through enabled. In this instance, the host computer 102 has a standard SATA serial interface 140. Particularly, because the host is not pass-through enabled, the host ignores pass-through information received from device 104.

Figure 2:
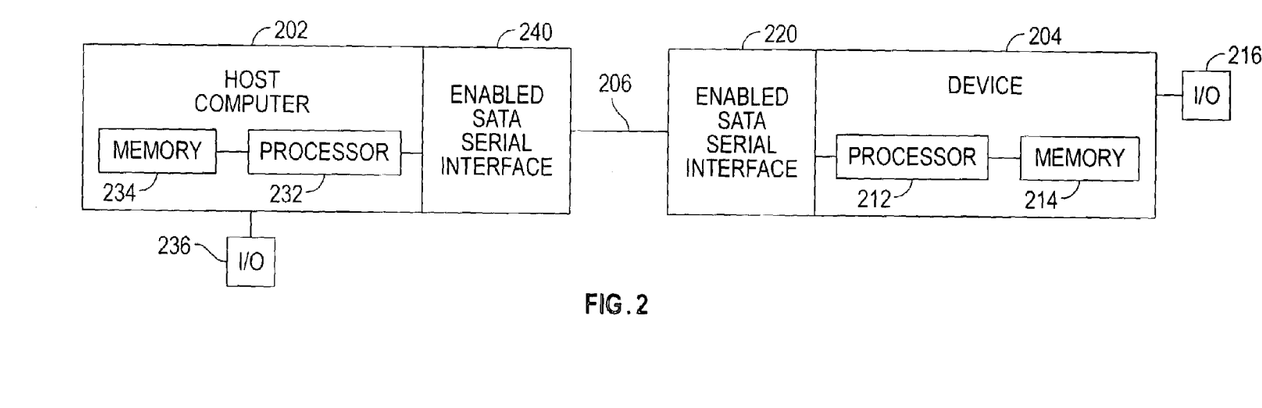
FIG. 2 is a block diagram illustrating a pass-through enabled device and a pass-through enabled host computer.

Turning now to FIG. 2. FIG. 2 is a block diagram illustrating a pass-through enabled device 204 and a pass-through enabled host computer 202. Again, device 204 includes a processor 212 to control operations in the device 204 along with a memory 214 and various I/O devices 216. Further, device 204 includes an enabled SATA serial interface 220 that through interconnect 206 is connected to a host computer 202. The host computer 202 includes a processor 232 to control operations in the host computer, as well as a memory 234, and various I/O devices 236. Further, in this instance, the host computer 202 includes an enabled SATA serial interface 240 for the receipt of serial communication from device 204, and particularly recognizes pass-through information from device 204.

In this instance, because the host computer 202 is pass-through enabled by having enabled SATA serial interface 240, the host computer 202 recognizes the pass-through information transmitted by device 204. It should be appreciated that in this example both enabled host computer 202 and enabled host device 204 can transmit pass-through information to one another.

In one embodiment, inserted pass-through information that is transmitted by the device or host after the transmission of a continued primitive is accomplished by replacing pseudo-random data with a message information structure (MIS) that includes the pass-through information. The MIS transmitted by the device or the host may include a start of message (SOM) primitive sequence to indicate a beginning of the pass-through information to be transmitted and an end of message (EOM) primitive sequence to indicate that the passthrough information has been transmitted. The MIS and the pass-through information may be scrambled. The pass-through information may include message, data, status, and/or command information.

It should be appreciated that these are very simplified examples of hosts 102, 202 and devices 104, 204, in which embodiments of the invention may be practiced. Various types of hosts or devices such as personal computers, laptop computers, network computers, set-top boxes, servers, routers, expanders, RAIDs, mainframes, enterprise environments, etc., or any type of computing device or system having a processor and/or memory may be utilized with embodiments of the invention.

Figure 3:
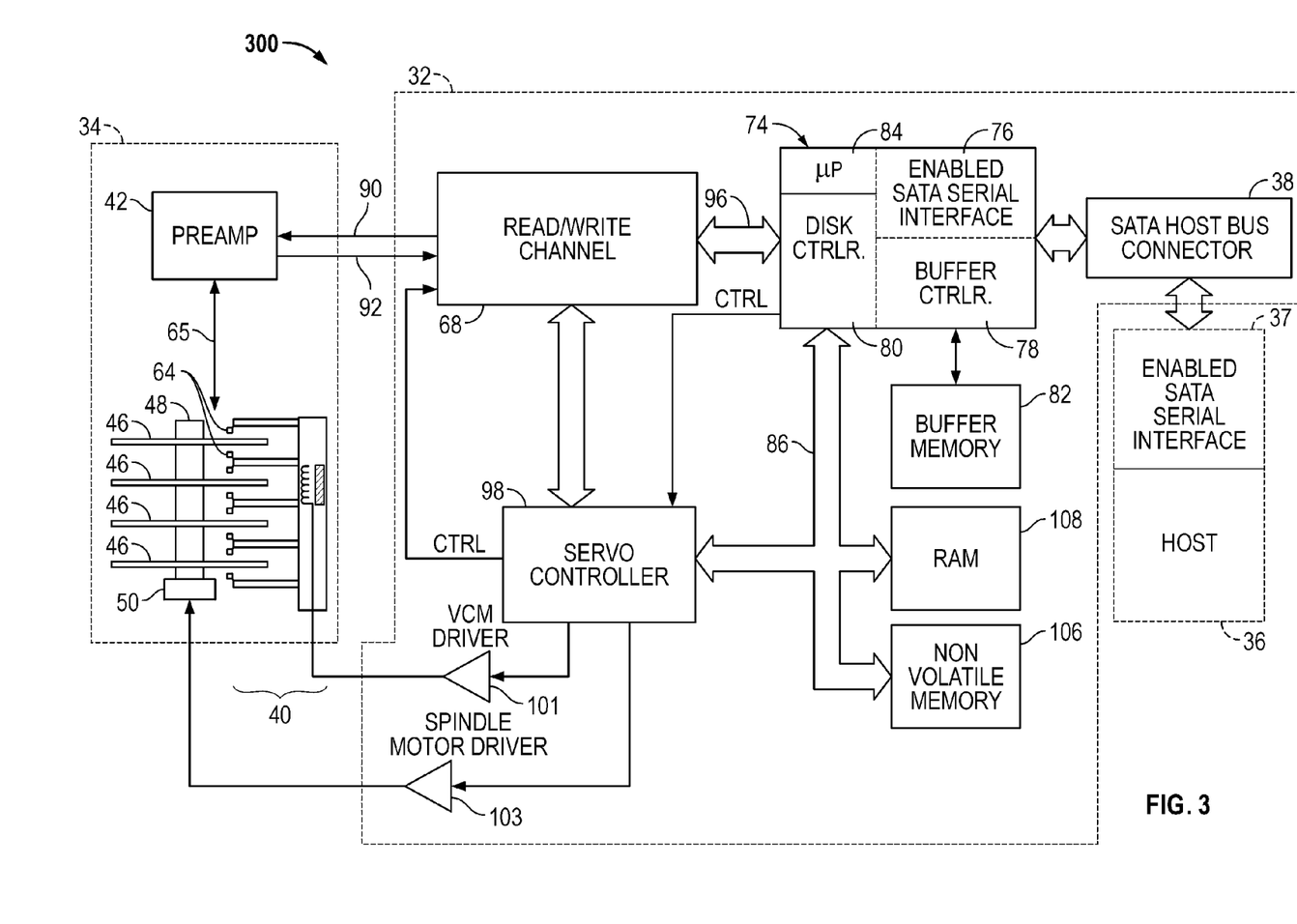
FIG. 3 is a block diagram illustrating a disk drive, such as a hard disk drive.

Additionally, an example of a device such as a hard disk drive 300 will now be illustrated as one type of storage device in which embodiments of the invention may be practiced. However, it should be appreciated that, the embodiments to be hereinafter described may be utilized for a wide variety of different types of storage devices (e.g., CD-ROM, DVD, floppy drive, flash memory, micro-drives, etc.) or any type of device that interconnects and communicates to a host.

With reference now to FIG. 3, FIG. 3 is a block diagram illustrating a disk drive, such as a hard disk drive. Hard disk drive 300 may be connected to a host computer 36 over an interconnect. The interconnect may include suitable connectors and cabling to connect disk drive 300 to host 36. In particular, in this example, hard disk drive 300 includes an enabled SATA serial interface 76 connected through a SATA host bus connector 38 to interconnect with a host 36 also having an enabled SATA serial interface 37.

Disk drive 300 comprises a Head/Disk Assembly (HDA) 34 and a controller printed circuit board assembly, PCBA 32. Although a disk drive 300 is provided as an example, it should be appreciated that embodiments of the invention to be hereinafter discussed may be utilized with any suitable device.

The HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface disk controller HIDC 74, voice coil motor driver VCM 102, spindle motor driver SMD 103, and several memory arrays—buffer or cache memory 82, RAM 108, and non-volatile memory 106.

Host initiated operations for reading and writing data in disk drive 300 are executed under control of a microprocessor 84 connected to controllers and memory arrays via a bus 86. Program code executed by microprocessor 84 may be stored in non-volatile memory 106 and random access memory RAM 108. Program overlay code stored on reserved tracks of disks 46 may also be loaded into RAM 108 as required for execution.

During disk read and write operations, data transferred by preamplifier 42 is encoded and decoded by read/write channel 68. During read operations, channel 68 decodes data into digital bits transferred on an NRZ bus 96 to HIDC 74. During write operations. HIDC provides digital data over the NRZ bus to channel 68 which encodes the data prior to its transmittal to preamplifier 42. Preferably, channel 68 employs PRML (partial response maximum likelihood) coding techniques.

HIDC 74 comprises a disk controller 80 for formatting and providing error detection and correction of disk data and other disk drive operations, an enabled SATA serial interface controller 76 for responding to commands from host 36, a buffer controller 78 for storing data which is transferred between disks 46 and host 36, and microprocessor 84. Collectively the controllers in HIDC 74 provide automated functions which assist microprocessor 84 in controlling disk operations.

A servo controller 98 provides an interface between microprocessor 84 and actuator assembly 40 and spindle motor 50. Microprocessor 84 commands logic in servo controller 98 to position actuator assembly 40 using a VCM driver 101 and to precisely control the rotation of spindle motor 50 with a spindle motor driver 103.

In one embodiment, disk drive 300 is compatible with a serial interface standard, such as, SATA and/or SAS. The disk controller 74 and other components of the disk drive may be programmed and/or designed to be compatible with such a serial interface standard.

Figure 4:
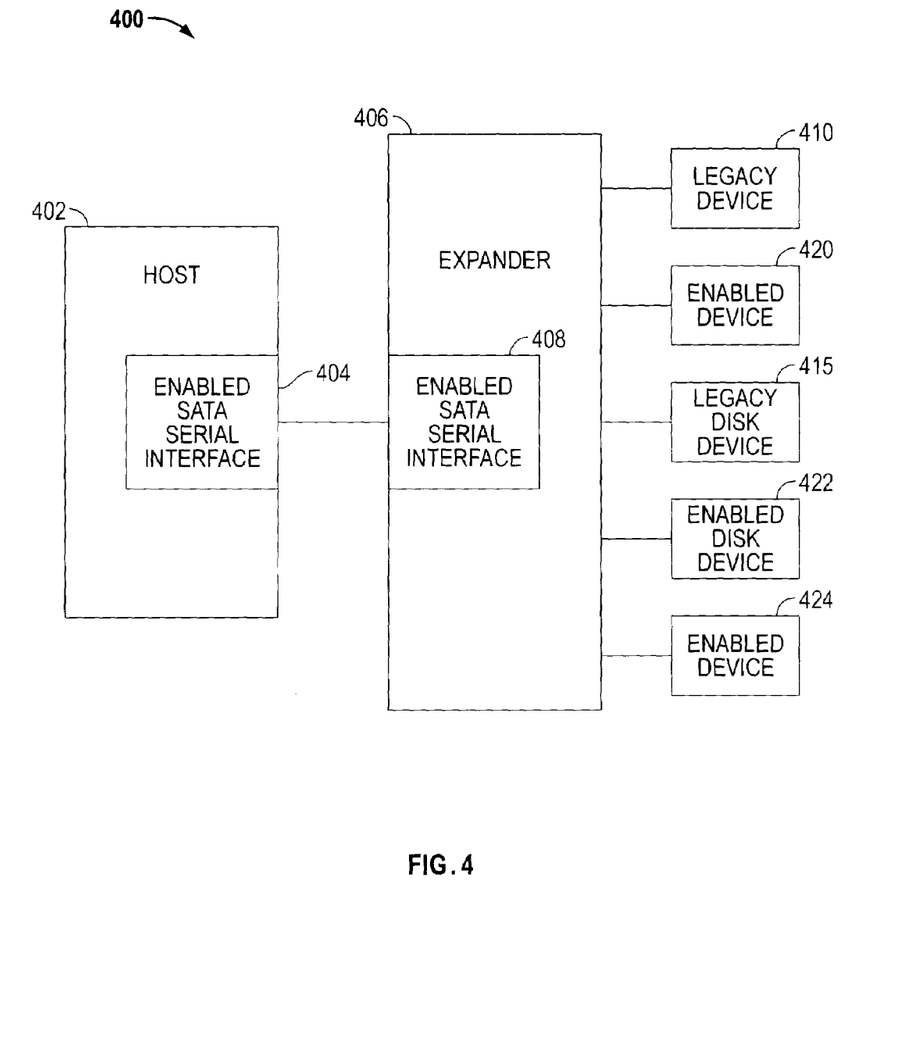
FIG. 4 is a block diagram of an environment in which a host includes an enabled SATA serial interface and is connected through an expander to a plurality of legacy devices and a plurality of enabled devices.

Further, with reference to FIG. 4, a block diagram of another exemplary environment 400 is shown in which a host 402 includes an enabled SATA serial interface 404 connected via a suitable SATA compatible interconnect to an enabled SATA serial interface 408 of an expander 406 such that host 402 can communicate pass-through information to a plurality of legacy devices 410 and 415 that are not pass-through enabled, which ignore pass-through information, as well as a plurality of enabled devices 420, 422, 424 that are pass-through enabled which recognize the pass-through information and can correspondingly transmit pass-through information back to the host 402.

As set forth in the previous exemplary environments of FIGS. 1, 2, 3, and 4, it should be appreciated by those of skill in the art that by using enabled SATA serial interfaces, pass-through information may be inserted as part of an MIS by a host or device and if the corresponding host or device, respectively, is not pass-through enabled, the receiving host or device will ignore the pass-through information. However, if the receiving host or device is pass-through enabled (e.g. having an enabled SATA serial interface), the receiving host or device will recognize the pass-through information and can utilize it, respectively.

Various embodiments of the invention are described in detail. However, such details are included to facilitate understanding of the invention and to describe exemplary embodiments for employing the invention. Such details should not be used to limit the invention to the particular embodiments described because other variations and embodiments are possible while staying within the scope of the invention. Further, although numerous details are set forth in order to provide a thorough understanding of the embodiments of the invention, it will be apparent to one skilled in the art that these specific details are not required in order to practice the embodiments of the invention.

In other instances, details such as, well-known methods, types of data, protocols, procedures, components, electrical structures and circuits, are not described in detail or shown in block diagram form, in order not to obscure the invention. Furthermore, embodiments of the invention will be described in particular embodiments but may be implemented in hardware, software, firmware, or a combination thereof.

Looking more particularly at the functional aspects of inserting pass-through information within the SATA format, the insertion of pass-through information between the device and the host, and vice-versa, typically occurs at a link layer of the SATA format.

Figure 5:
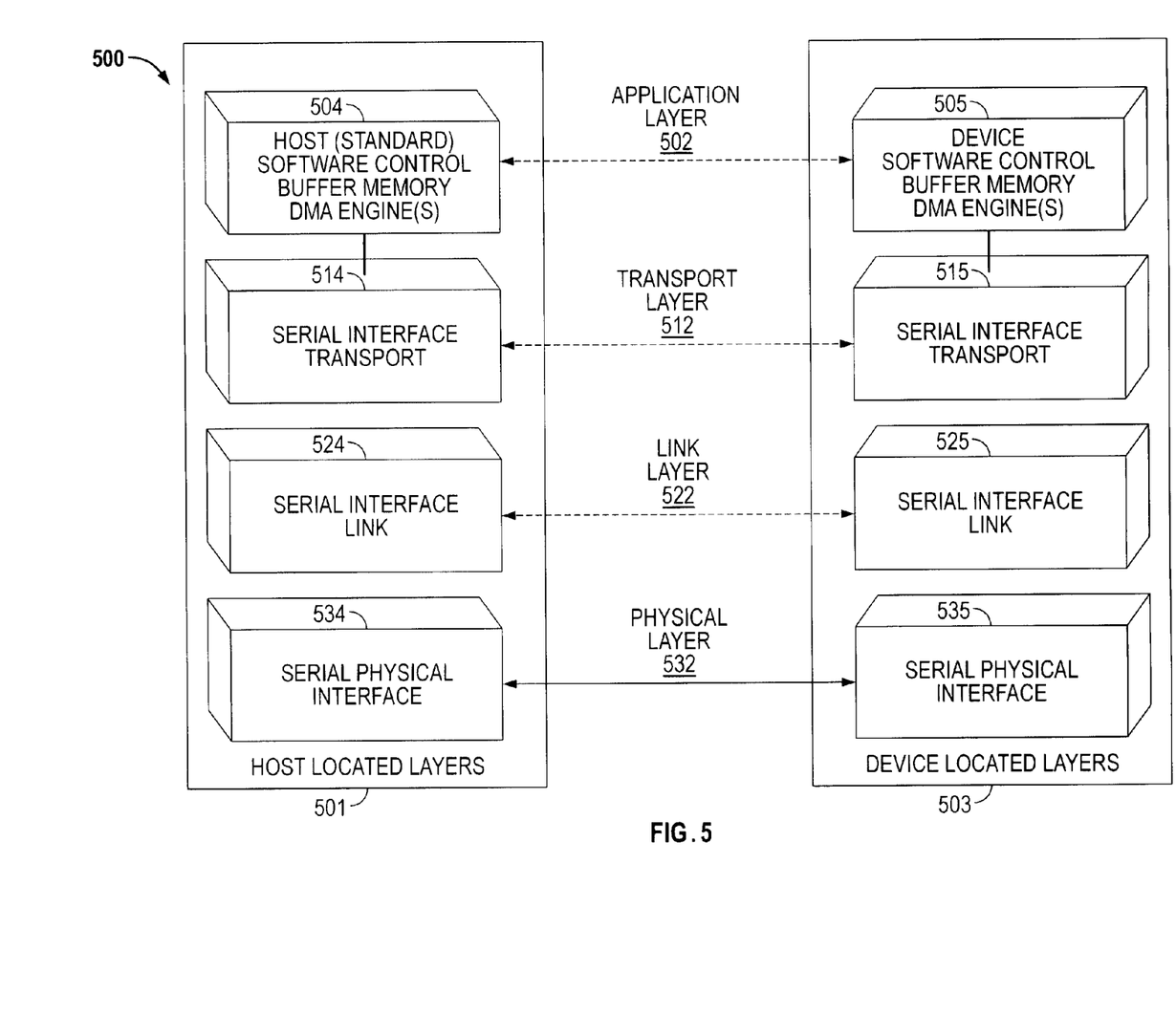
FIG. 5 is a block diagram illustrating the layers associated with the SATA interface format.

Turning now to FIG. 5, FIG. 5 is a block diagram illustrating the layers associated with the SATA interface hierarchy format 500. The SATA interface hierarchy provides a communications path between a host 501 and a device 503. The SATA interface hierarchy is defined as consisting of a set of communications protocol layers including: an application layer 502 between host software control buffer memory DMA engines and device software control buffer memory DMA engines; a transport layer 512 between host serial interface transport 514 and device serial interface transport 515; a link layer 522 between host serial interface link 524 and device serial interface link 525; and a physical layer 532 between host serial physical interface 534 and device serial physical interface 535. Embodiments of the invention relate to at least changes in the link layer 522 to allow for the transfer of message information structures (MISs) and pass-through information. Particularly, the insertion of pass-through information between the device and the host, and vice-versa, typically occurs at the link layer 522.

The SATA interface format uses control sequences, called primitives, to indicate the current state or to indicate state transitions. For example, primitives are used to indicate when a frame information structure (FIS) begins and ends. Besides primitives, the SATA format also defines data words that are used to transfer commands, data, and status. Payload data words can only be transferred within a FIS in current SATA interface format. Both primitives and data words are composed of a set of four encoded characters. The SATA interface format uses the well-known 8*b*-10*b* encoding method. The four encoded characters of data word consist of four byte values, each of which can represent one of 256 values. The four encoded characters of a primitive consist of one specially encoded control character and three byte values. The control characters are different from any of the 256 data character values. While there are only two control characters defined in the SATA format, and a larger number by the SAS format, a large number of primitives can be defined by varying the control character or the three-byte values that accompany the control character. Collectively, primitives or data words are referred to as DWORDS.

Because a primitive contains a control character that cannot exist within a data word, primitives can be easily distinguished from data words during the receive process. The SATA format standard defines the use of the CONT (e.g. a continued primitive) followed by pseudo-random data to replace long sequence of repeated primitives. This is done for various reasons, including reduction of EMI and transmission bus effects by suppressing repeated patterns on the bus, known to cause undesirable effects.

The suppression of repeated patterns is accomplished by replacement of repeated primitives with a CONT primitive followed by pseudo-random data. This is an independent function within the transmission path of the link layer 522 of the SATA interface. A reception of a CONT and pseudo-random data and the replacement of these with original primitives is also an independent function within the receive path of the link layer 522.

Embodiments of the invention allow for new primitives or character streams to be created that may be used in place of the defined primitives of the SATA format. These new primitives may be suitably selected to avoid legacy compatibility issues by ensuring that they are ignored by non-enabled pass through devices and hosts.

The use of the term CONT, CONT primitive, or CONT sequence includes any primitive or sequence of characters (e.g. a continued primitive) that can be recognized by an enabled SATA serial interface and corresponding host or device and ignored by a device or host not having an enabled SATA serial interface. Particularly, these continued primitives should be recognized by an enabled SATA serial interface by a straight transition that occurs on the interface that indicates subsequent characters are not part of the SATA format FIS payload, until terminated by another primitive or sequence of characters. An example of an enabled SATA serial interface will be hereinafter discussed with reference to FIG. 6.

Particularly, the SATA interface format looks at a stream of DWORDs generated by the upper levels of the SATA protocol, and looks for repetitive occurrences of certain primitives. Also, hereinafter the term "CONT" will be used as a shorthand for a continued primitive. Within the SATA definition, some primitives are frequently repeated. The SATA serial interface implements CONT processing to replace these repeated primitive sequences with pseudo-random data. Upon reception, the received CONT processing hardware reverses the substitution made by the transmit CONT processing, restoring the sequence of DWORDs so that it can be processed by the upper levels of the protocol stack. Any pseudo-random data that follows a CONT is discarded.

Particularly, in accordance with embodiments of the invention, the pseudo-random data that follows a CONT is replaced with a message information structure (MIS) containing passthrough information. When MISs are transmitted, the payload is scrambled in a similar manner to FIS scrambling already defined by the SATA format to avoid the negative effects of repeated patterns as previously described.

MIS pass-through techniques allow for the utilization of otherwise lost interface bandwidth for the transfer of information. It also allows for information to be transferred between devices that may not conform to the defined SATA protocols without affecting those protocols or violating compliance to the established SATA standards. This information can be transmitted and received independently and asynchronously of normal SATA command processes. This technique for transparently sending information has advantages for communication with enabled devices and enabled hosts to extend the capability of SATA in such a manner that devices and hosts that are enabled utilize the pass-through information and devices and hosts that are not enabled to receive pass-through information function normally, ignoring the pass-through information. Further, the new information may be transported through expanders, port multipliers, routers, or other devices without modifications to those devices. In addition, enabled devices may utilize the new features afforded by the information and communicate transparently between the devices.

Figure 6:
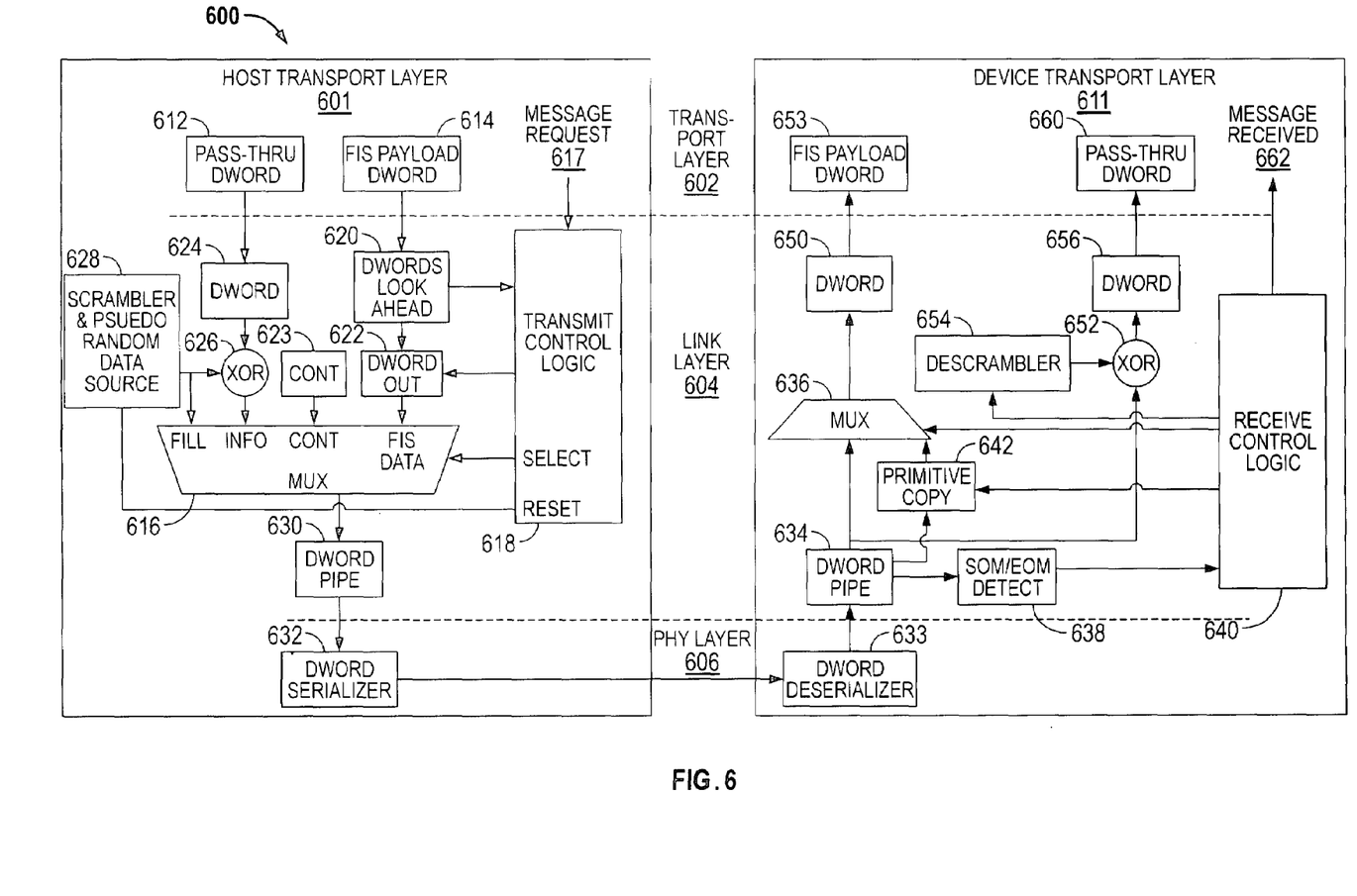
FIG. 6 is a block diagram illustrating an example of functionality to implement the insertion of pass-through information

Turning now to FIG. 6, FIG. 6 is a block diagram illustrating an example of functionality to implement the insertion of pass-through information, and the recognition and receipt of pass-through information by host-transmitting and device-receiving enabled SATA serial interfaces, respectively. This system 600 may be divided into transactions that occur at the transport layer 602, the link layer 604, and the physical layer 606.

At the host transmit side at the host transport layer 601, the host receives the FIS payload DWORD transmit stream from the host transport layer 601 (the source and destination for the FIS) at block 614, and stores a portion of the DWORDs in a DWORD look ahead buffer 620 to determine if repeated patterns are being transmitted and whether or not CONT replacement is needed, and when the repeated pattern is no longer being transmitted, that the replacement of repeated patterns should be exited. This may be controlled by transmit control logic 618.

Under the control of transmit control logic 618 DWORDs from DWORD buffer out 622 may be multiplexed in FIS data input of MUX 616, through DWORD pipe 630, DWORD serializer 632, and onto the physical layer 606.

The CONT primitive 623 may be inserted via multiplexer 616 (under the control of transmit control logic 618) and the repeated CONT primitive 623 may be replaced with a pseudo-random data DWORD supplied by the scrambler and pseudo-random data source 628 via the Mux Fill 616 as selected by the transmit control logic 618.

On the receive side (e.g. the device in this example), the device accepts the data stream at the physical layer 606. DWORD deserializer 633 accepts the DWORD portion and transmits the deserialized DWORD portion onto DWORD pipe 634. A copy of the current primitive is copied into a primitive copy register 642. This functionality may be controlled by receive control logic 640. The receive control logic 640 determines when a CONT or post-CONT pseudo-random DWORD is being received and replaces the CONT primitive and pseudo-random DWORD with the original primitive from the copy register by controlling multiplexer 636 having an input of the primitive copy 642.

Further, when normal DWORD data from DWORD pipe 634 (i.e. non-pass-through information) is transmitted through multiplexer 636 as controlled by receive control logic 640, this DWORD information 650 is simply transmitted as standard SATA format FIS payload DWORDs to FIS payload DWORD buffer 653 of the device transport layer 611.

In addition to the previously-described standard functionality enabled by the SATA format, embodiments of the invention further include additional functionality to support the addition of pass-through information that is recognized by pass-through enabled devices or hosts and that is ignored by non-enabled devices or hosts. Particularly, a transmit data path from the host transport layer 601 for pass-through information to be sent to the link layer 604 is included.

As shown in the host transport layer 601, pass-through DWORD data 612 may be transmitted to the link layer 604 into DWORD buffer 624. An XOR 626 allows for the scrambling of the pass-through DWORD data in a similar manner to data scrambling for conventional SATA FIS payloads. This may be controlled by transmit control logic 618. This optional feature provides additional noise margin on the physical interface.

Further, multiplexer 616 allows for the selection and insertion of pass-through information MISs, which are accepted at the INFO port of multiplexer 616 under the control of transmit control logic 618. Alternatively, the pseudo-random output may be utilized through the FILL port of the multiplexer 616 as fill after the CONT primitive when no message is present. Also, a control path is coupled to scrambler 628 for reset selection by the transmit control logic 618. Message requests 617 may be signaled to the control logic 618 from the host transport layer 601 to indicate a transmission of an MIS.

Thus, through DWORD pipe 630 of the link layer 604 and through DWORD serializer 632 of the physical layer 606, either standard SATA DWORD messages may be sent (through FIS data port of Mux 616) or, specialized pass-through MISs (through INFO port of Mux 616) may be sent to a device that when enabled, recognizes the pass-through information and when not enabled merely discards it.

As previously discussed, inserted pass-through information after the transmission of a continued primitive (CONT) includes replacing pseudo-random data with a message information structure (MIS) that includes pass-through information. The MIS transmitted by the device may include a start of message (SOM) primitive sequence to indicate a beginning of the pass-through information to be transmitted and an end of message (EOM) primitive sequence to indicate that the pass-through information has been transmitted. The MIS and the pass-through information may be scrambled via scrambler 628, as previously discussed.

To accomplish this, on the receiver side (e.g. in this example the device side), a receive data path that extracts the pass-through information from the data stream upon reception of a CONT and the detection of a MIS is utilized. Particularly, based upon DWORDS from DWORD deserializer 633 and from DWORD pipe 634 a start of MIS (SOM) via SOM/EOM detector 638 is identified and the receive control logic 640 is signaled. These DWORDS are simultaneously sent to XOR 352.

Descrambler 654 in conjunction with XOR 652 may be utilized to reverse the scrambling of pass-through information in a similar manner to the data descrambling for FIS payloads. Detector 638 also detects end of message (EOM) detection or transfer count termination. Based upon SOM and EOM detection by detector 638 (and descrambling performed by descrambler 654), controlled by receive control logic 640, a path from DWORD pipe 634, through XOR 652, provides pass-through information to DWORD buffer 656 and pass-through DWORD buffer 660 to the device transport layer 611 such that a MIS that includes pass-through information (e.g. pass-through DWORD 660) is transmitted to the device's transport layer. Transmit control logic 640 may also include a message received signal indication 662 to indicate an MIS has been received.

In order to implement pass-through information scrambling, data scrambler 628 and data descrambler 654 may be utilized. Particularly, a pseudo-random data source may be combined with data scrambler 628, and when no MIS message is required, data scrambler 628 acts only as a pseudo-random data source. When MIS pass-though data is transmitted, scrambler 628 acts as a data scrambler using well-known methods.

Alternatively, when normal DWORD data from DWORD pipe 634 (i.e. non-pass-through information) is transmitted through multiplexer 636 as controlled by receive control logic 640, this DWORD information 650 is simply transmitted as standard SATA format FIS payload DWORDs to FIS payload DWORD buffer 653 of the device transport layer 611.

It should be noted that MIS exchanges utilize the "discarded" pseudo-random data field that follows a CONT. When it is desired to initiate a MIS transfer, the link layer needs a CONT to occur so that the pass-through information can be sent. There is no arbitration between the two ends when a CONT is used. The sender merely starts the CONT process and can start a MIS transfer.

Also, it should be appreciated that these MIS exchanges allow for full duplex operation because the host and the device may initiate and complete MIS transfers simultaneously. Thus, information may be advantageously transferred in the opposite direction simultaneously in normal SATA transfers.

It should be appreciated that although FIG. 6 illustrates the functionality of an enabled SATA serial interface at the host side to send pass-through information to the device side that the same functionality in terms of hardware and/or software is also present to enable device side to the host side transmissions of pass-through information.

Also, it should be appreciated that the transmission of the pass-through information between the device and the host may occur in a simplex mode, a half-duplex mode, or a full duplex mode.

In one embodiment, the message information structure (MIS) and the pass-through information may be transmitted during an idle (SYNC) phase. Further, the MIS and the passthrough information may be transmitted during at least one of a transmit ready (X_RDY) HOLD phase, a HOLD Acknowledge phase, a wait for termination (WTRM) phase, a receipt ready (R_RDY) phase, a receipt in progress (R_IP) phase, or a receipt OK (R_OK) phase.

Figure 7:
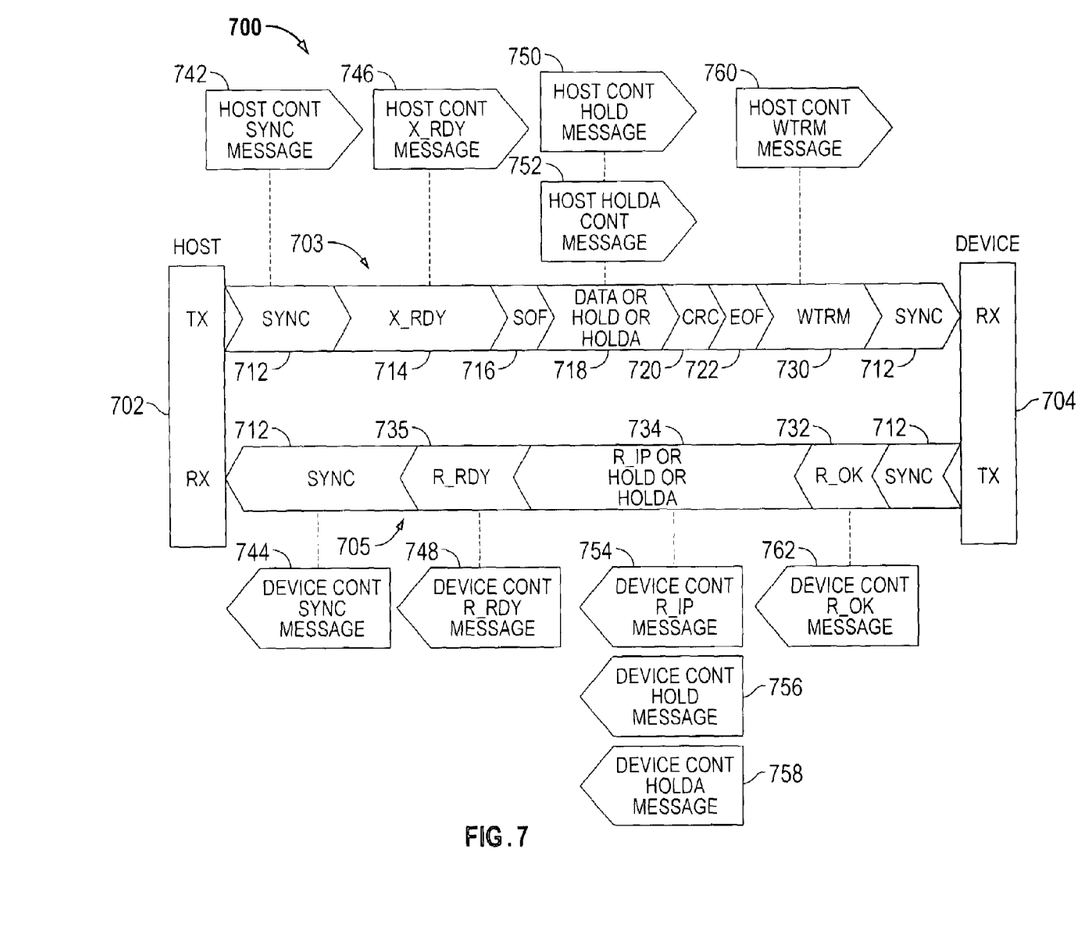
FIG. 7 is a diagram illustrating a typical FIS transfer as well as locations at which a CONT command may be used to transmit message information structures (MISs) and pass-through information.

With reference to FIG. 7, a diagram 700 is shown that illustrates a typical FIS transfer and particularly illustrates locations at which a CONT command may be used to transmit message information structures (MISs) and pass-through information. This may be accomplished with the structure and functionality previously-described with reference to FIGS. 1-6.

First, a typical FIS transfer from a host 702 to a device 704 is illustrated to help in the explanation. To begin with, the host 702 and the device 704 start in an idle state by transmitting idle signals (SYNC) 712. The host 702 begins a transfer by sending X_RDY (transmit ready) 714 and waits for the device 704 to indicate the device's readiness to receive a frame information structure (FIS). The device 704 indicates that it is ready to receive a FIS by returning R_RDY (receive ready) 735.

The host 702 having received the device's readiness begins a frame of information with a SOF (start of frame) primitive 716. The host 702 follows the SOF 716 with payload data 718 to be transferred. The host 702 may also transmit HOLD for control purposes or respond with HOLDA (hold acknowledge) when the device 704 requests flow control. In turn, the device 704 responds to the receipt of data with an R_IP (receipt in process) 734. Additionally, the device may also transmit HOLD for flow control purposes or respond with HOLDA when the host requests flow control.

After the payload transfer is complete, the host 702 sends CRC checksum characters 720 followed immediately by an EOF (end of frame) primitive 722. The device 704 may continue to send R_IP or HOLD or HOLDA 734 during this time.

The host 702 transmits WTRM (wait for termination) 730 and awaits the device 704 to acknowledge the FIS. The device 704 recognizes the EOF character 722, and if the CRC checksum 720 was correct, acknowledges receipt with R_OK (received OK) 732.

The host 702, upon receiving the device's R_OK acknowledgment 732, returns to the idle state (SYNC) 712. The device 704, determining that the host has accepted its R_OK, also returns to the idle state (SYNC) 712.

With the FIS transmission example previously described, there are various points during this process at which a continued primitive (CONT) may be used to transmit message information structures (MISs) and pass-through information. These opportunities will be noted and indicated as follows.

For example, as indicated by message block 742, prior to FIS transmission, the bus is idle and both the host 702 and the device 704 are transmitting SYNC primitives 712. During this time, the host 702 may transmit a host-to-device MIS during the CONT sequence following a SYNC primitive. At message block 744, while the device 704 is idle, the device may transmit a device-to-host MIS during the CONT sequence following a SYNC primitive.

At message block 746, the host 702 may transmit a host-to-device MIS during the CONT sequence following an X_RDY primitive. At message block 748, the device 704 may transmit a device-to-host MIS during the CONT sequence following a R_RDY primitive. At message block 750, the host 702 may transmit a host-to-device MIS during the CONT sequence following a HOLD primitive. The host may also force a HOLD at any time during this phase to send a MIS. Similarly, at message block 752, the host may transmit a host-to-device MIS during the CONT sequence following a HOLD acknowledge (HOLDA) primitive.

At message block 754, the device 704 may transmit a device-to-host MIS during the CONT sequence following an R_IP primitive. At message block 756, the device 704 may also transmit a device-to-host MIS during the CONT sequence following a HOLD. The device may also force a hold at anytime during this phase to send a message. At message block 758, the device 704 may additionally transmit a device-to-host MIS during the CONT sequence following a HOLDA primitive.

At message block 760, the host 702 may transmit a host-to-device MIS during the CONT sequence following a WTRM primitive. At message block 762, the device 704 may transmit a device-to-host MIS during the CONT sequence following an R_OK primitive.

It can be seen from the previous example of FIG. 7 that simultaneous messages may be transmitted between the host and the device and vise-versa, allowing for full-duplex operation. This is seen, for example, in message blocks 750-758, when the host may be sending a message during HOLD and the device may be sending a message during HOLDA. Multiple such opportunities have been demonstrated.

Figure 8:
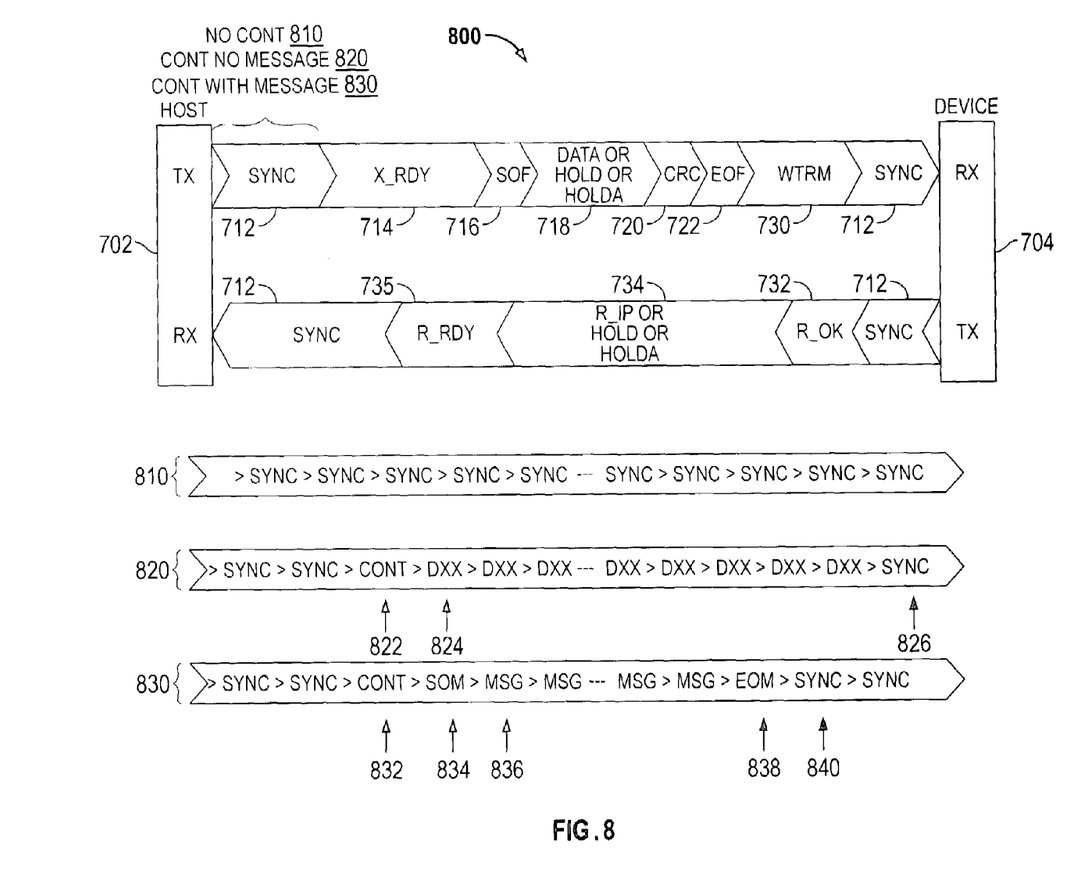
FIG. 8 is a diagram illustrating an example of primitive replacement using a CONT primitive and inserting a MIS including pass-through information.

Turning now to FIG. 8. FIG. 8 is a diagram illustrating a typical FIS transfer as well as an example of primitive replacement using a continued primitive and inserting a MIS including pass-through information.

As shown in transmission sequence 810, only idle (SYNC) primitives are sent. In transmission line 820, idle (SYNC) primitives are sent and a normal continued primitive (CONT) is shown. Particularly, SYNC primitives are fist sent to initiate a sequence. After at least two SYNCs have been transmitted, a CONT primitive is transmitted as shown at arrow 822. After the CONT primitive is transmitted, pseudo-random data characters are sent as shown at arrow 824 for as long as the SYNC sequence is required. When the protocol requires a transition to another sequence, another SYNC primitive at arrow 826 is sent to exit the CONT mode. The CONT sequence is exited by the transmission of any primitive, and this may be the same primitive or the next primitive needed. For example, in this case, an X_RDY may be transmitted.

Lastly, in transmission sequence 830 (wherein the transmission of a MIS and pass-through information is desired) the host at arrow 832 initiates a CONT sequence in the same manner as described in transmission sequence 820. However, instead of transmitting pseudo-random data characters DXX, the host sends a start of message (SOM) primitive or sequence as shown at arrow 834. The SOM may be a unique primitive, or a single unused data character or a sequence of data characters identifying a message header. Since not all data characters are used by the CONT pseudo-random pattern, many other data characters are available for this use. After the SOM, the pass-through information payload (MSG) of the MIS shown at arrow 836 is transmitted.

After the pass-through payload of the MIS has been transmitted, the host transmits an end of message (EOM) primitive or sequence as shown at arrow 838. The EOM may be constructed in a similar manner to the SOM. After the EOM has been transmitted, the host transmits the SYNC primitive indicated at arrow 840 to exit the CONT sequence. The CONT sequence is exited by the transmission of any primitive, and this may be the same primitive or the next primitive needed. For example, an X_RDY may be transmitted.

It should be appreciated that these sequences may be implemented from either device to host or host to device in a simplex mode, half-duplex mode, or a full duplex mode.

Thus, as previously discussed, utilizing enabled serial interfaces after a transmission of a continued primitive, pass-through information may be inserted within or outside of a frame information structure (FIS). This may be done for either a host or device such that if the host or device is not pass-through enabled, the host or device ignores the pass-through information, respectively. However, if the host or device is pass-through enabled, the host or device recognizes the pass-through information, respectively.

It should be appreciated by those of skill in this art that, although embodiments of the invention have been previously described with reference to the SATA and/or SAS protocol and format, that embodiments of the invention may be utilized with any serial interface format.

What is claimed is:

1. A device communicatively coupled to a host in a Serial Advanced Technology Attachment (SATA) format, the device comprising:
   a processor to control operations in the device; and
   a serial interface to control serial communication with the host in accordance with the SATA format, including:
      after a transmission of a continued primitive by the device, inserting pass-through information to the host by replacing pseudo-random data with a message information structure (MIS) that includes the pass-through information, prior to the device sending a primitive;
   wherein the host is one of pass-through enabled or not pass-through enabled, and if the host is not pass-through enabled, the host ignores the pass-through information, whereas if the host is pass-through enabled, the host recognize the pass-through information.

2. The device of claim 1, wherein the MIS transmitted by the device includes a start of message (SOM) primitive sequence to indicate a beginning of the pass-through information to be transmitted and an end of message (EOM) primitive sequence to indicate that the pass-through information has been transmitted.

3. The device of claim 1, wherein the MIS and the pass-through information are scrambled.

4. The device of claim 1, wherein the pass-through information includes at least one of message, data, status, or a command.

5. The device of claim 1, wherein the inserting of the pass-through information between the device and the host occurs at a link layer.

6. The device of claim 1, wherein the message information structure (MIS) and the pass-through information are transmitted during an idle (SYNC) phase.

7. The device of claim 1, wherein the message information structure (MIS) and the pass-through information are transmitted during at least one of a transmit ready (X_RDY) HOLD phase, a HOLD Acknowledge phase, a wait for termination (WTRM) phase, a receipt ready (R_RDY), a receipt in progress (R_IP) phase, or a receipt OK (R_OK) phase.

8. The device of claim 1, wherein the transmission of the pass-through information between the device and the host occurs in a simplex mode.

9. The device of claim 1, wherein the transmission of the pass-through information between the device and the host occurs in a half-duplex mode.

10. The device of claim 1, wherein the transmission of the pass-through information between the device and the host occurs in a full duplex mode.

11. The device of claim 1, wherein the device is a disk drive.

12. A host communicatively coupled to a device in a Serial Advanced Technology Attachment (SATA) format, the host comprising:
   a processor to control operations in the host; and
   a serial interface to control serial communication with the device in accordance with the SATA format, including:
      after a transmission of a continued primitive by the host, inserting pass-through information to the device by replacing pseudo-random data with a message information structure (MIS) that includes the pass-through information, prior to the host sending a primitive;
   wherein the device is one of pass-through enabled or not pass-through enabled, and if the device is not pass-through enabled, the device ignores the pass-through information, whereas if the device is pass-through enabled, the device recognize the pass-through information.

13. The host of claim 12, wherein the MIS transmitted by the host includes a start of message (SOM) primitive sequence to indicate a beginning of the pass-through information to be transmitted and an end of message (EOM) primitive sequence to indicate that the pass-through information has been transmitted.

14. The host of claim 12, wherein the MIS and the pass-through information are scrambled.

15. The host of claim 12, wherein the pass-through information includes at least one of message, data, status, or a command.

16. The host of claim 12, wherein the inserting of the pass-through information between the host and the device occurs at a link layer.

17. The host of claim 12, wherein the message information structure (MIS) and the pass-through information are transmitted during an idle (SYNC) phase.

18. The host of claim 12, wherein the message information structure (MIS) and the pass-through information are transmitted during at least one of a transmit ready (X_RDY) HOLD phase, a HOLD Acknowledge phase, a wait for termination (WTRM) phase, a receipt ready (R_RDY), a receipt in progress (R_IP) phase, or a receipt OK (R_OK) phase.

19. The host of claim 12, wherein the transmission of the pass-through information between the host and the device occurs in a simplex mode.

20. The host of claim 12, wherein the transmission of the pass-through information between the host and the device occurs in a half-duplex mode.

21. The host of claim 12, wherein the transmission of the pass-through information between the host and the device occurs in a full duplex mode.

22. The host of claim 12, wherein the device is a disk drive.

23. A device communicatively coupled to a host in a Serial Advanced Technology Attachment (SATA) format, the device comprising:
   a processor to control operations in the device; and
   a serial interface to control serial communication with the host in accordance with the SATA format, including:
      after a transmission of a continued primitive by the host, the host inserts pass-through information to the device by replacing pseudo-random data with a message information structure (MIS) that includes the pass-through information, prior to the host sending a primitive;
   wherein the device is one of pass-through enabled or not pass-through enabled, and if the device is not pass-through enabled, the device ignores the pass-through information, whereas if the device is pass-through enabled, the device recognize the pass-through information.

24. The device of claim 23, wherein the MIS transmitted by the device includes a start of message (SOM) primitive sequence to indicate a beginning of the pass-through information to be transmitted and an end of message (EOM) primitive sequence to indicate that the pass-through information has been transmitted.

25. The device of claim 23, wherein the MIS and the pass-through information are scrambled.

26. The device of claim 23, wherein the pass-through information includes at least one of message, data, status, or a command.

27. The device of claim 23, wherein the inserting of the pass-through information between the device and the host occurs at a link layer.

28. The device of claim 23, wherein the message information structure (MIS) and the pass-through information are transmitted during an idle (SYNC) phase.

29. The device of claim 23, wherein the message information structure (MIS) and the pass-through information are transmitted during at least one of a transmit ready (X_RDY) HOLD phase, a HOLD Acknowledge phase, a wait for termination (WTRM) phase, a receipt ready (R_RDY), a receipt in progress (R_IP) phase, or a receipt OK (R_OK) phase.

30. The device of claim 23, wherein the device is a disk drive.

* * * * *